United States Patent [19]

Isherwood et al.

[11] Patent Number: 4,871,038
[45] Date of Patent: Oct. 3, 1989

[54] COMBINATIONAL WEIGHING SYSTEMS

[75] Inventors: Jonathan M. Isherwood, Leamington Spa; Robert W. Tansley, Stratford-Upon-Avon, both of England

[73] Assignee: Driver Southall Limited, England

[21] Appl. No.: 162,001

[22] Filed: Feb. 29, 1988

[30] Foreign Application Priority Data

Mar. 9, 1987 [GB] United Kingdom ............... 8705451

[51] Int. Cl.⁴ .................. G01G 13/00; G01G 23/14
[52] U.S. Cl. .................................. 177/25.18; 177/164
[58] Field of Search .................. 177/25.18, DIG. 11, 177/164

[56] References Cited

U.S. PATENT DOCUMENTS

| 4,466,500 | 8/1984 | Mosher et al. ............ 177/25.18 X |
| 4,534,428 | 8/1985 | Mosher, et al. . |
| 4,544,042 | 10/1985 | Mikami ..................... 177/25.18 |
| 4,548,287 | 10/1985 | Matsuura . |
| 4,565,254 | 1/1986 | Matsuura . |
| 4,627,504 | 12/1986 | Moran . |
| 4,664,200 | 5/1987 | Mikami et al. ............. 177/25.18 |
| 4,683,966 | 8/1987 | Nakagawa et al. ........ 177/DIG. 11 |
| 4,705,125 | 11/1987 | Yamada et al. ............. 177/25.18 |
| 4,708,215 | 11/1987 | Nakamura et al. ........ 177/DIG. 11 |

FOREIGN PATENT DOCUMENTS

| 0060701 | 9/1982 | European Pat. Off. . |
| 0083227 | 7/1983 | European Pat. Off. . |
| 0085446 | 8/1983 | European Pat. Off. . |
| 0105145 | 4/1984 | European Pat. Off. . |
| 0160511 | 11/1985 | European Pat. Off. . |
| 0161068 | 11/1985 | European Pat. Off. . |
| 0178828 | 4/1986 | European Pat. Off. . |
| 0180429 | 5/1986 | European Pat. Off. . |
| WO/02002 | 6/1983 | PCT Int'l Appl. . |
| 2070362 | 9/1981 | United Kingdom . |
| 2085172 | 4/1982 | United Kingdom . |
| 2131963 | 6/1984 | United Kingdom . |
| 2136974 | 9/1984 | United Kingdom . |
| 2174818 | 11/1986 | United Kingdom . |

Primary Examiner—George H. Miller, Jr.
Attorney, Agent, or Firm—Kirschstein, Ottinger, Israel & Schiffmiller

[57] ABSTRACT

A combinational weighing system including a plurality of weighing machines each comprising a weighing hopper (20) and an associated hopper module (22) arranged to provide a measurement of the weight of the contents of the associated hopper (20); a plurality of channels (14) via which articles are respectively fed from a common source (17) directly into each of the hoppers (20); a central control (76) for utilizing the weight measurements provided by the hopper modules (22) to select from the hoppers (20) a number of hoppers (20) whose contents have a total weight substantially equal to a target weight; and the selected number of hoppers (20) discharging into a collection chute (24) to feed a batch of articles of substantially the target weight to a collection point.

17 Claims, 8 Drawing Sheets

COMBINATIONAL WEIGHING SYSTEMS

BACKGROUND OF THE INVENTION

1. Field of the Invention

This invention relates to combinational weighing systems.

More particularly the invention relates to combinational weighting systems of the kind, hereinafter referred to as the kind specified, comprising: a plurality of weighing machines each comprising a weighing hopper and an associated hopper module arranged to provide a measurement of the weight of the contents of the associated hopper; means for feeding articles into said hoppers; means for utilising the weight measurements provided by said hopper modules to select from said hoppers a number of hoppers whose contents have a total weight substantially equal to a target weight; and means for discharging said selected number of hoppers to provide a batch of articles of substantially said target weight.

2. Description of Related Art

In known, combinational weighing systems of the kind specified a plurality of secondary hoppers is provided either above or below the plurality of weighing hoppers, there being one secondary hopper in respect of each weighing hopper. If above, the secondary hoppers temporarily store articles before discharging them into respective weighing hoppers. If below, the secondary hoppers temporarily store articles after they have been weighed by respective weighing hoppers.

The purpose of the secondary hoppers is to maintain an even and fast passage of articles through the combinational weighing system. For example, a secondary hopper positioned above a respective weighing hopper may be fed steadily with articles whilst the weighing hopper is weighing so that when the weighing hopper is discharged it may be rapidly refilled with articles from the secondary hopper.

SUMMARY OF THE INVENTION

According to the present invention there is provided a combinational weighing system of the kind specified wherein said means for feeding articles to said hoppers comprises a plurality of channels via which articles are respectively fed from a common source directly into each of said hoppers; and said hoppers are arranged to discharge directly into a collection chute to feed said batch of articles of substantially said target weight to a collection point.

It will be appreciated that having a single hopper between each respective channel and the collecting chute simplifies the combinational weighing system making it cheaper and easier to service and maintain.

Preferably, each hopper module is associated with a respective means for individually controlling the feeding of articles to the hopper associated with that hopper module in dependance on the weight of articles in that hopper.

Preferably, each said hopper module is associated with a respective means for individually calibrating and/or checking the accuracy of that hopper module.

Having such respective means associated with each hopper module facilitates the relatively fast operation of the combination weighing system by distributing the task of performing the operational procedures necessary throughout the system.

Preferably, each said weighing hopper is associated with a respective prime mover means for opening and closing a port in the hopper through which the contents of the hopper discharges when open. Said prime mover means is suitably an electric stepper motor.

The provision of such respective prime mover means for each weighing hopper enables each weighing machine to individually control the discharge of its respective weighing hopper. Use of a stepper motor for the prime mover facilitates accurate movement of the means, such as a door, for opening and closing the port to suit different products and speeds of operation of the system as a whole.

BRIEF DESCRIPTION OF THE DRAWINGS

One combinational weighing system in accordance with the present invention will now be described, by way of example, with reference to the accompanying drawings in which.

DETAILED DESCRIPTION OF THE PREFERRED EMBODIMENT

Figure 1:
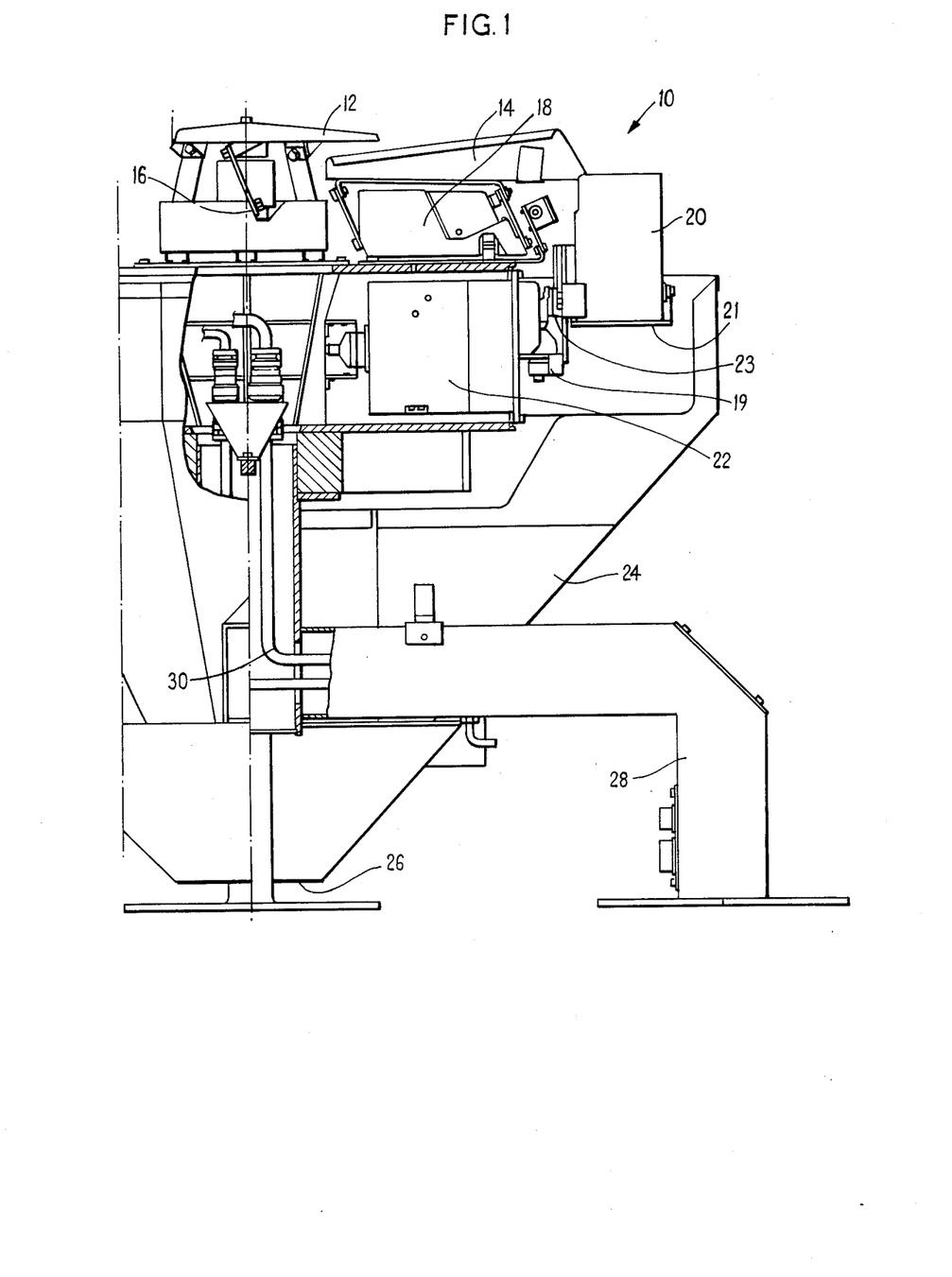
FIG. 1 is a part-sectional elevation of a portion of a weigher of the combinational weighing system.

Referring to FIG. 1, the system includes a weigher 10 having a centrally positioned circular table 12 which is caused to undergo vibratory motion by a vibrator 16 beneath the table 12 such that articles (not shown) on the table move radially towards the edge of the table 12. Extending radially outward from beneath the table 12 there are twenty-eight feeders 14, each in the form of a channel, the top of one side of each channel being folded over the top of the other side of the adjacent channel. Each feeder 14 is caused to undergo independent vibratory motion by a respective vibrator 18 disposed beneath the feeder 14. Hence, articles on reaching the edge of the table 12 fall onto the feeders 14 and are vibrated there along until reaching the outer ends of the feeders. Disposed beneath the outer end of each feeder 14 is a respective weighing hopper 20, the hoppers 20 therefore lying in a circle around the feeders 14. Upon reaching the outer ends of the feeders 14 the articles fall into the respective hoppers 20 and are stored thereby. At the bottom of each hopper 20 there is a hinged door 21 which may be opened and closed by means of a mechanism 23 operated by a hopper module 22, there being one module 22 for each hopper 20 and the twenty-eight modules 22 lying in a circle beneath the vibrators 18. Each module 22 further includes means for weighing the contents of the associated hopper 20, each hopper 20 being supported on its associated module 22 by a coupling 19. Weight signals representative of the weight of the contents of the hoppers 20 as measured by the respective modules 22 pass along a cable 30 and out of the weigher 10 via a duct 28. Operation of a mechanism 23 to open a hopper door 21 results in the contents of the hopper 20 falling into a common conical collecting chute 24 and hence out of the weigher 10 via an aperture 26 at the bottom of the chute 24 to a collection point.

In an alternative arrangement the weighing hoppers may be divided into two or more groups, e.g. two groups of fourteen hoppers, the hoppers of each group being arranged to discharge via a respective collecting chute to a respective collection point.

Figure 2:
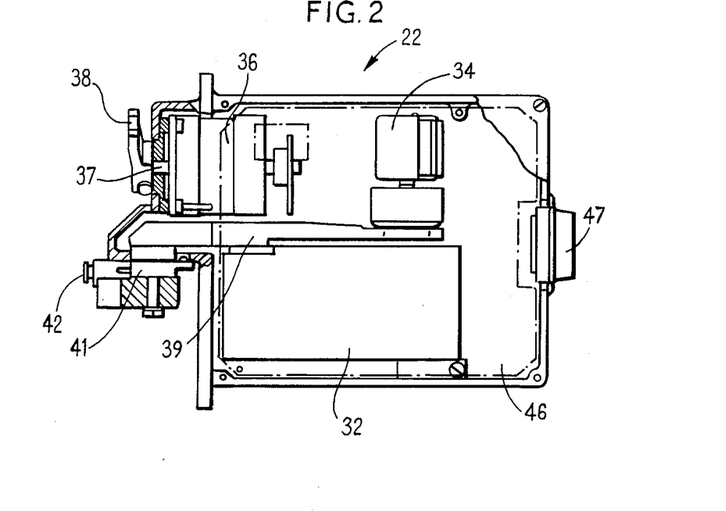
FIG. 2 is a part-sectioned side view of one of a plurality of hopper modules of the weigher.
Figure 3:
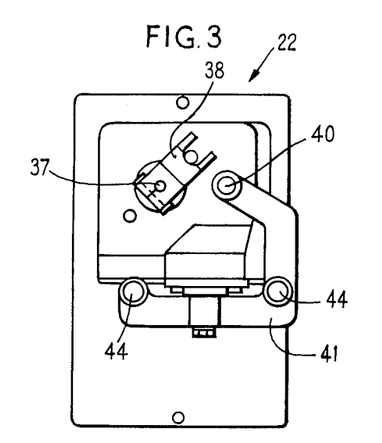
FIG. 3 is an end view of the hopper module of FIG. 2.

Referring now to FIG. 2 and FIG. 3, each module 22 includes a load cell 32, a calibration mechanism 34, a stepper motor 36 which drives via the rotor 37 of the motor a dog clutch 38, a weigh cell bracket 39, and a support member 41 having three projections 40, 42 and 44. Each module 22 further includes a circuit board 46, on which is located an electronic circuit for the module 22, and a connection 47 whereby information from the module 22 may pass to the cable 30 and vice versa.

Figure 4:
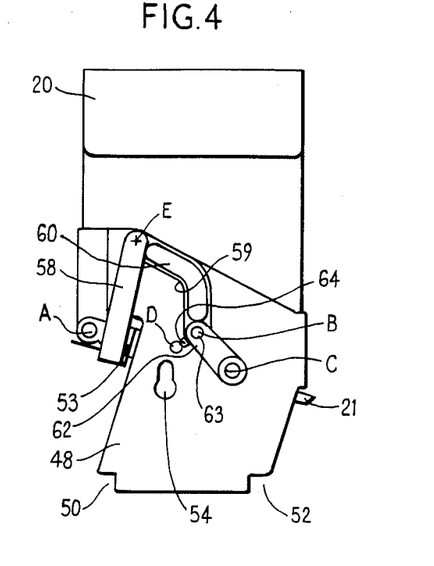
FIG. 4 is a first elevation of one of a plurality of weighing hoppers of the weigher.
Figure 5:
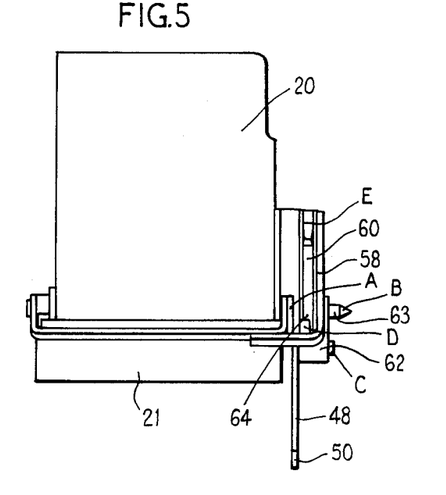
FIG. 5 is a second elevation of the weighing hopper of FIG. 4.

Referring to FIG. 4 and FIG. 5, fixed to the inner side of each hopper 20 there is a metal plate 48 having at its lower two corners shoulder grooves 50, 52 and extending through its mid-portion an aperture 54. Rigidly fixed to a point 53 on the hopper door 21 adjacent the door hinge axis A is one end of a first member 58, the other end of the first member 58 being pivotally connected on an axis E to one end of a dog-leg member 60. The other end of the dog-leg member 60 is pivotally connected on an axis B to one end of a second member 62, the other end of the second member 62 being pivotally connected on the axis C to a mid-portion of the plate 48 near the aperture 54. A projection 64 at the end of the dog-leg member 60 pivotally connected on axis B, abuts against a stop D on the plate 48 when the door 21 closes. Extending axially from the second member 62 on the axis B there is a drive projection 63. The projection 63, the second member 62, the dog-leg member 60 including projection 64, the first member 58, the fixing at the point 53 and the stop D together including grooves 50, 52 and aperture 54 constitute part of the aforementioned coupling 19.

Referring now to FIGS. 2, 3, 4 and 5, in use of the weigher 10 each hopper 20 is supported on a respective module 22 by placing the projections 40, 42 and 44 into the receiving aperture 54 and the shoulder grooves 50 and 52 respectively of a hopper 20. The hopper 20 is then slid downwards to secure it to its respective module 22. The weight of the hopper 20, the contents of the hopper 20, the mechanism 23 and the metal plate 48 will therefore act on the three projections 40, 42 and 44, this weight being transmitted via the support member 41 and the weigh cell bracket 39 to the load cell 32 where it is measured. Processing of this measure weight takes place in the electronic circuit of the module 22 on the circuit board 46. When a module 22 is connected to a respective hopper 20 as afore described, the dog clutch 38 is positioned so as to engage the drive projection 63 on the hopper. The stepper motor 36 can thus rotate the dog clutch 38 and hence the projection 63 about the axis C. With reference to FIG. 4, rotation of the projection 63 in the anti-clockwise direction results in the first member 58, dog-leg member 60 and second member 62 attaining the position, shown in FIG. 4, where the hopper door 21 is closed and the projection 64 of the dog-leg member 60 abuts against the stop D is prevent further rotation of the pivot B in the anti-clockwise direction. It would be noted that in this position the projection 63 and hence axis B is beneath a straight line drawn between the axis E and the axis C. Hence the axis B has moved into an over-centre position and consequently the hopper door 21 cannot be opened by downward pressure on the door. Rotation of the projection 63 in the clockwise direction causes the projection 63 to rotate clockwise about the axic C until the inner edge 59 of the dog-leg member 60 abuts against the pivotal connection between the second member 62 and the metal plate 48. Such abutment prevents further rotation of the projection 63 in the clockwise direction and defines the open position of the hopper door 21. When the hopper door 21 is in the position shown in FIG. 4, i.e. is closed so that articles may be fed into the hopper 20 for weighing, the dog clutch 38 is positioned by the stepper motor 36 so as not to contact the projection 63. This avoids interference of the dog clutch 38 with the weighing of the hopper 20.

Figure 6:
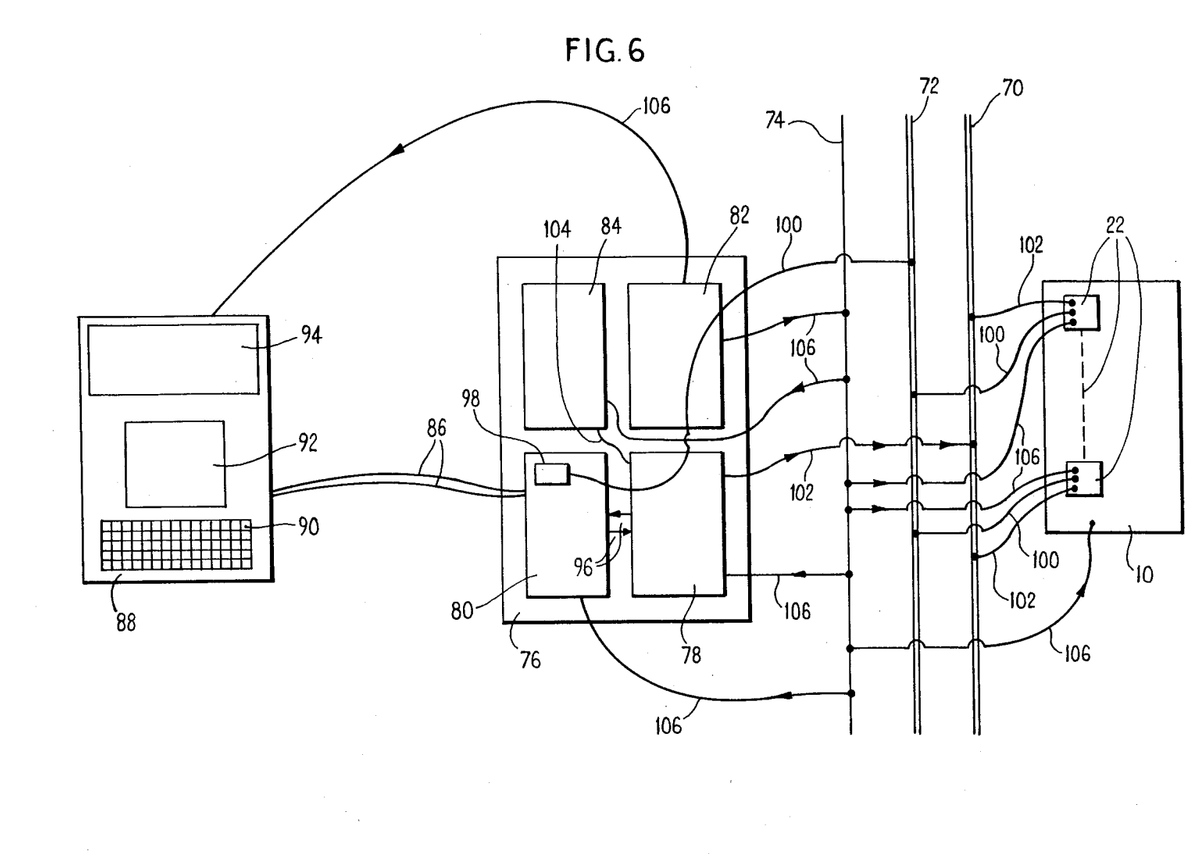
FIG. 6 is a schematic circuit diagram of the combinational weighing system.

Referring to FIG. 6, the electronic circuit of each module 22 is connected to a serial communications bus 70, an analogue weight bus 72 and a power bus 74. The bus 70 and the bus 72 are used to pass information between the weigher 10 and the host 76. The bus 74 is used to pass power to the weigher 10 for the entire operation of the weigher 10, including low voltage power for the circuit board 46, and high voltage power for driving the vibrators 16, 18 and the stepper motor 36. The weigher 10 is controlled by a host 76, via the buses 70, 72, 74 as aforementioned. The host 76 includes a host processor circuit board 78, an input/output (I/O) processor circuit board 80, a power supply 82 and an external input output (I/O) board 84. Connected to the board 80 via a two wire serial communications link 86 there is a display controller 88 comprising a membrane keyboard 90, a graphics display 92 and a printer 94.

The weigher 10, host 76 and display controller 88 together comprise a combinational weighing system.

The controller 88 is the user interface of the system, data being fed into the system via the keyboard 90 and obtained from the system via the display 92 or printer 94. The controller 88 may form the user interface for more than one weighing system which need not necessarily be a weighing system in accordance with the invention. The I/O processor board 80 communicates via the link 86 with the controller 88 and via the link 96 with the host hoard 78. Via these links 86, 96 it retrieves parameter information about the weighing system from the board 78 and passes it to the controller 88, it also receives parameters information from the controller 88 and updates such information in the board 78. By the use of "text menus" stored in the board 80 the board 80 instructs the controller 88 what to display at any one time. The I/O processor board 80 includes an accurate sixteen bit analogue to digital converter (ADC) 98. Modules 22 may be connected one at a time via connectors 100 and the analogue weight bus 72 to the ADC 98 in order for the weight data output by the modules 22 to be utilised to a high resolution. This weight data is then fed to the host board 78 via the connection 96. The host board 78 contains the main intelligence circuitry of the host 76 and transmits control signals to the weigher 10 and the modules 22 via connections 102 and the fast serial communications bus 70. The weight signals aforementioned from the individual modules 22 fed by the I/O processor board 80, via the link 96, to the host board 78 may be processed by the host board 78. The board 78 has the capability to store and sort combinations of these weight signals. The external I/O board 84 has sixteen outputs and sixteen inputs. The outputs are capable of driving, for example, external relays on other equipment and the inputs may be connected to other equipment, for example, photocells. For example, it is the signals fed by and to the I/O board 84 which synchronise the positioning of a container beneath the aperture 26 of the chute 24 in time to catch the contents of the discharged hoppers 20. Furthermore, signals passing to and from the I/O board 84 control the rate at which articles are supplied to the central vibrating table 12, so as not to swamp or starve the weigher 10 with/of articles. The board 84 is connected to the host board 78 via a connection 104. The power supply 82 provides the power for the entire operation of the combinational weighing system via the bus 74 and connections 106.

The circuit intelligence of each module 22 located on the circuit board 46 has the ability to turn 'on' and 'off' its corresponding feeder 14 in dependence upon the weight it measures in its corresponding hopper 20, such weight being a weight value 'asked' of it by the host board 78. Therefore, each module 22 has the capability to be a weighing machine all on its own, although its weight measurements are of a low resolution. Once a module 22 has measured the weight 'asked' of it, it signals to the host 76 that weighing is complete and will place such a weight signal on the analogue bus 72 on command from the host 76. Furthermore, each module 22 controls the operation of its corresponding hopper door 21 in response to signals from the host board 78.

Having now described the various parts of the combinational weighing system, their relation to each other and their properties, the entire operation of the complete system will now be described.

The basic function of the system is to feed successive batches of articles of substantially a target weight set by the operator into a series of containers placed in turn to receive articles via the aperture 26 at the bottom of the chute 24. To this end articles are fed onto the table 12 and hence fed to the hoppers 20 due to the vibratory motion of the table 12 and the feeders 14. When the contents of each of the hoppers 20 is substantially of an 'aim' weight, as further explained below, supply of the articles is stopped and the weight of the contents of each hopper is accurately measured. Using these accurte weight measurements, a selection is made from the hoppers of a number of the hoppers, typically four, the total weight of whose contents differs by not more than a preset amount from the target weight. The contents of the selected hoppers is then discharged into a container, and the process repeated for filling of a further container.

Figure 7A:
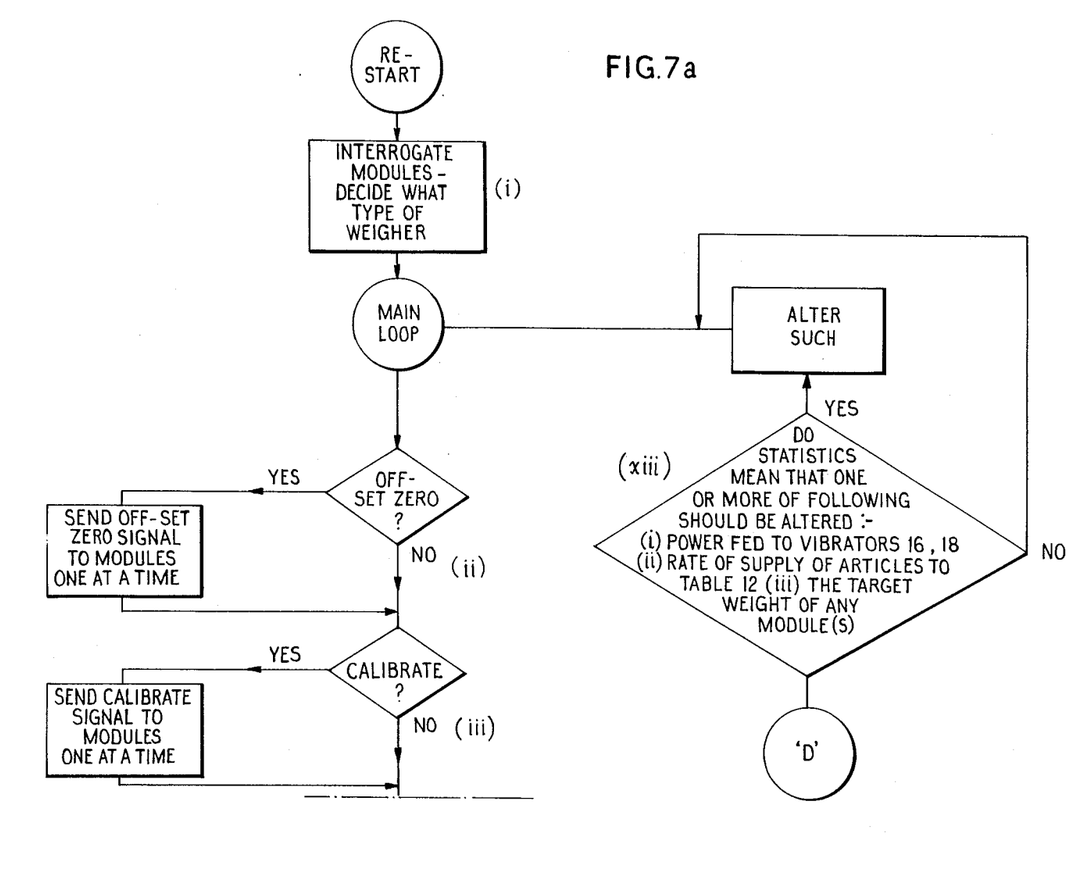
FIGS. 7a & b and 8a & b are flow charts showing the operation of the combinational weighing system.
Figure 7B:
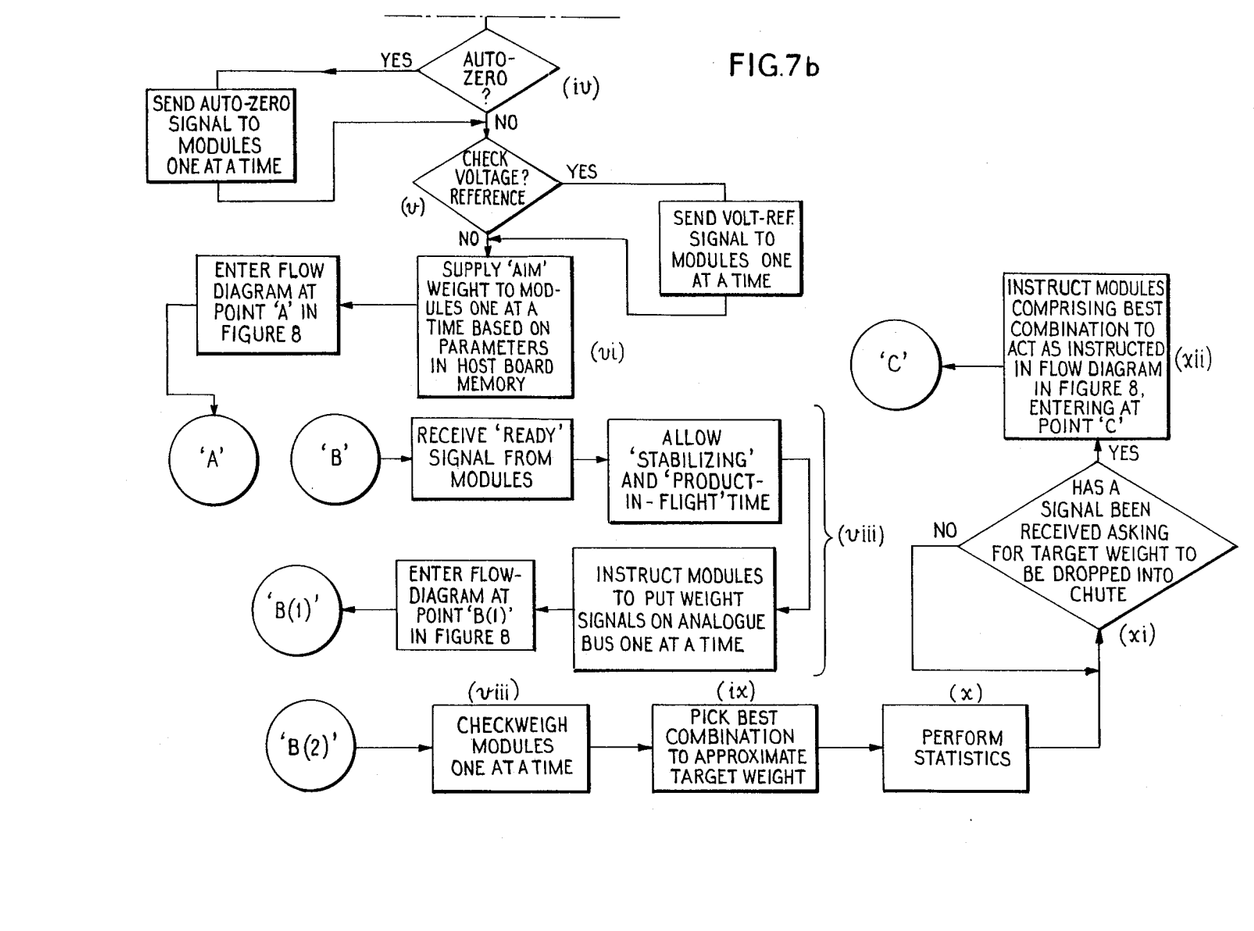
Figure 8A:
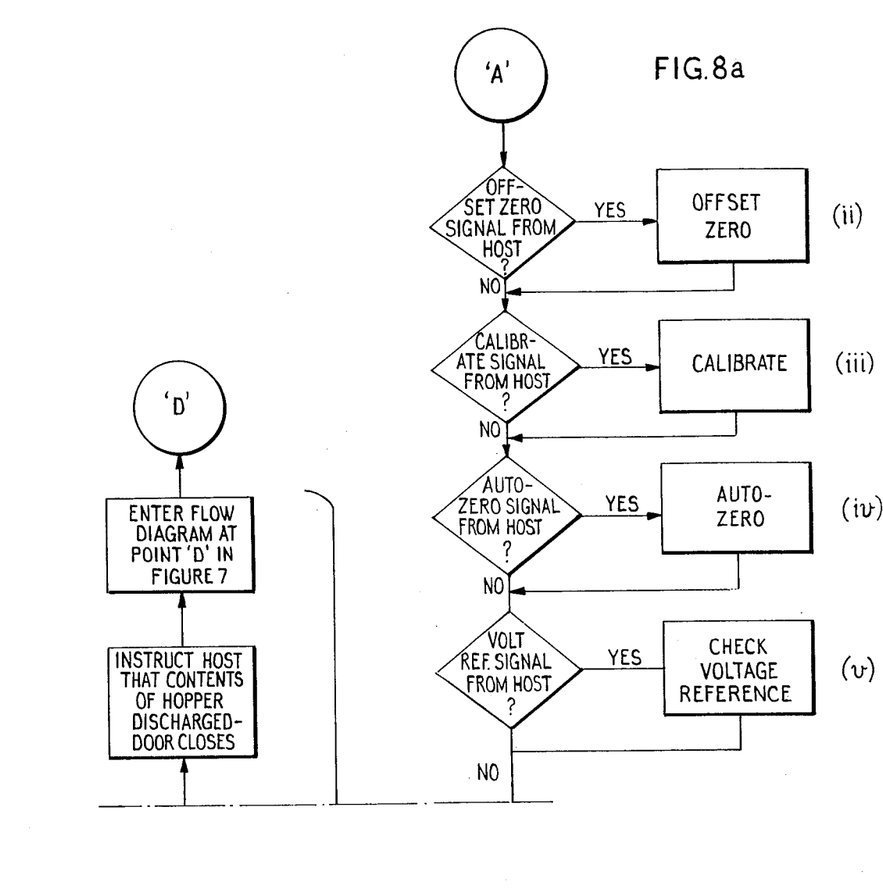
Figure 8B:
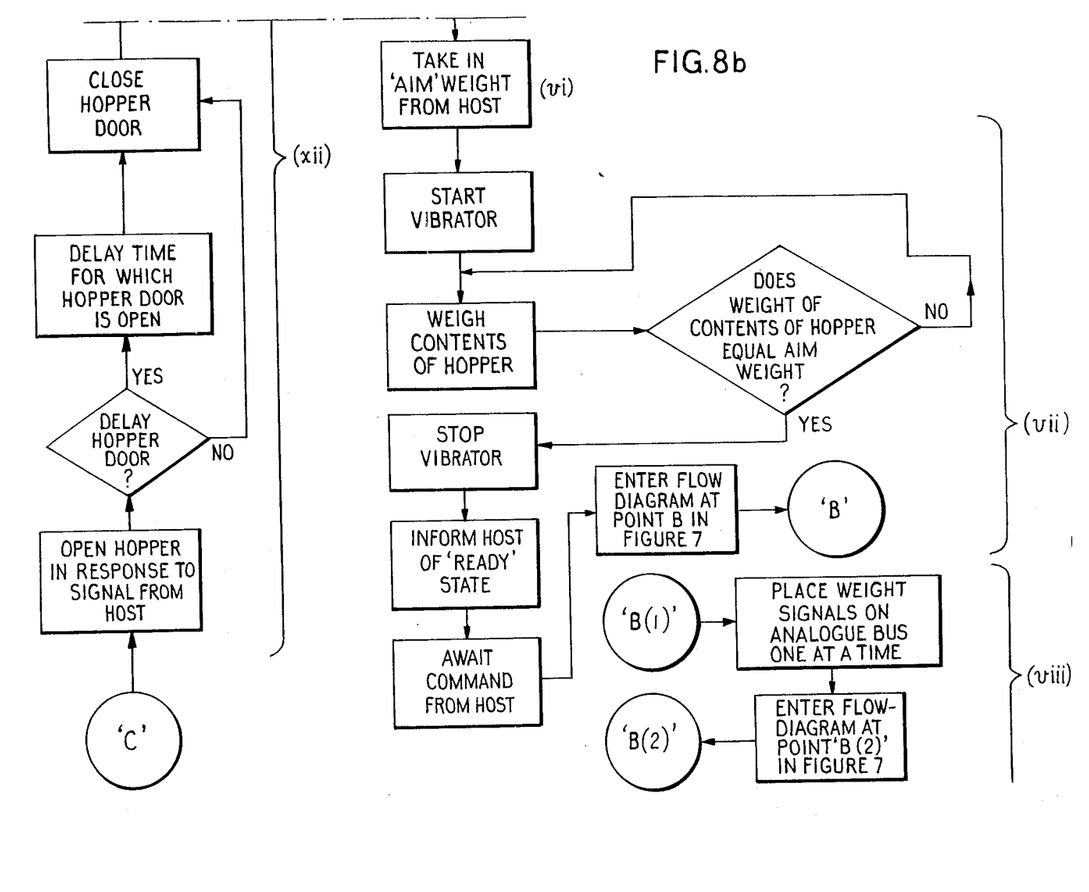

The operation of the system will now be described in detail with reference to FIG. 7 and FIG. 8.

Step (i)

As soon as the combinational weighing system is rendered operative the host 76 interrogates each module 22 in turn to discover how many modules 22 it is connected to and therefore what type of weigher 10 it is connected to. Such a procedure is called self determination and enabels one common software package to be used with weighers 10 having differing numbers of modules 22. Such self determination only occurs once each time the system is operative.

Step (ii)

The next step is to adjust the analogue signal output from each load cell 32, the purpose of such adjustment being to remove from the signal that proportion of it attributable to the weight of the empty hopper 20, the support member 41 and the weigh cell bracket 39 so that a true reading of the weight of the contents of the hopper 20 can be found. Since amplification of the aforementioned analogue signal occurs when it passes through a d.c. amplifier present on the circuit board 46 of the module 22 the effects of such amplification must also be considered when the aforementioned adjustment takes place. Such adjustment, known as zero-offsetting, is effected automatically by means of a microprocessor, one fine and one coarse digital to analogue converter (DAC's) and an amplifier summing junction present on the circuit board 46 of the module 22. In operation, a hopper 20 is weighed empty and the corresponding analogue signal output from the load cell 32 is fed to the amplifier summing junction. Subsequently the two DAC's together produce one analogue signal in response to a digital output from the microprocessor this signal being also fed to the amplifier summing junction where it is combined with the aforementioned analogue signal output from the load cell 32. The microprocessor will then adjust its digital output, which in turn changes the output of the two DAC's until the aforementioned combination of signals in the summing junction is a precise cancellation. The necessary digital signal from the microprocessor required for such cancellation or offset can then be sent to the host 76 where it can be stored and used to offset the next time the system is operative. Such offsetting occurs only once each time the system is operative.

Step (iii)

The next step is the calibration of each module 22. On command from the host 76 a module 22 will lower a calibration weight e.g. 200 grammes by means of the actuation of a d.c. solenoid onto the load cell 32, the calibration weight and the d.c. solenoid constituting the calibration mechanism 34. The host 76 will then 'ask' the module 22 for the anlogue signal produced by the load cell 32 as a consequence of the presence of the calibration weight. The host 76 then processes this signal and uses the resulting data as calibration data for that particular module 22. Such calibration usually occurs only once each time the system is operative.

Step (iv)

After a preset time each hopper 20 is left empty after a discharge. Its associated module 22 then weighs it empty and the output produced is then used to calculate a new zero point for that module 22. This procedure accounts for any 'zero-drift' in the load cell 32 and electronics present on the cirucit board 46. Only one module 22 undergoes this procedure at any one time, the remaining modules 22 staying operative. The aforementioned preset time is alterable. Any change detected in the zero point in this step is communicated to the host 76 which compensates for such in subsequent weighs by that module 22. The aforementioned procedure is called 'auto-zeroing' and is distinct from zero-offsetting (see step (ii)) in that it does not result in an alteration of the output of the two DAC's present in each module 22.

Step (v)

Each loadcell 32 utilises a voltage reference. In order to cater for thermal instability in this voltage reference and hence preserve the accuracy of the weighing by the loadcell 32 the host 76 after a preset time can 'ask' for, measure and store the value of the voltage reference. Such measurement by the host 76 enables adjustment of the weight measurements of the loadcell 32 by the host 76 to cater for the thermal instability of the voltage reference. The aforementioned preset time is equal to the preset time between successive 'auto-zeroing' procedures (see step (iv) above) and is alterable.

Step (vi)

The host 76 supplies an 'aim' weight to each module 22, one at a time. It should be noted that the host 76 will not supply an 'aim' weight to a module 22 that has contents in its respective hopper 20 remaining after a previous operation of the combinational weighing system. The 'aim' weight of each module 22 is initially the target weight i.e., the total weight required to be dropped by the weigher 10 divided by four, however the 'aim' weight of each module 22 may vary from this and is dependent on a series of factors. These are:

(a) In certain modes of operation of the combinational weighing system it is possible to allow the final weight dropped by the weigher 10 to wander above and below the required target weight, provided that over a period of time the mean weight discharged by the weigher 10 is above or equal to the target weight. To ensure that the mean weight is as stated the host 76 may alter the 'aim' weights of one or more modules 22. The host 76 determined whether such alteration should occur by statistically monitoring the past performance of the combination weight system (see step (x) below).

(b) The efficient working of the combinational weighing system depends upon getting a distribution of weights of contents in the hoppers 20. If the contents is a fine, consistent product, for example powder, the individual weight in the hoppers 20 may be too close to provide a reasonable distribution. To overcome this, the 'aim' weights of the modules 22 may be set by the host 76 in a deviation pattern (see step (x) below).

(c) Once a module 22 has instructed its respective feeder 14 to stop because the module 22 has detected that its 'aim' weight has been reached there will always be a certain amount of 'product in flight' which will be undetected by the module 22 and lead to a weight a little over the 'aim' weight in each respective hopper 20. To cope with this tendancy to overfill, the host 76 monitors (see step (x) below) the 'aim' weight of each module 22 and the actual weight of product that there was in that module's 22 respective hopper 20 when the weight of that hopper 20 is measured to high resolution by the host 76 itself. Such monitoring enables adjustments to the 'aim' weight of each module 22 to be made to compensate for 'product in flight'.

Step (vii)

Each module 22 receives an 'aim' weight from the host 76. This 'aim' weight is utilised by the two DAC's in each module 22 to set an analogue value which must be matched by the signal coming from the load cell 32 of each module 22. When such a match has occurred, this is detected by the microprocessor on the circuit board 46 in each module 22 and each module 22 informs the host 76 that it is 'ready'. Note here that the intelligence of each module 22 has the ability to stop and start its corresponding feeder 14 as indicated on the flow diagram in FIG. 8.

Step (viii)

The host 76 then allows time for the 'product in flight' (see Step (vi)(c) above) to arrive in the respective hoppers 20 and also time for the analogue signals present in the load cells 32 to stabalize. After this time the host 76 instructs each module 22 to put, one at a time, its weight signal on the analogue bus 72. The host 72 then utilises the weight signals output by the load cells 32 to a high resolution, compared to the low resolution use of these signals by the intelligence of the modules 22, to perform an signals by the intelligence of the modules 22, to perform an 'accurate' weigh of the contents of each respective hopper 20. It 'accurately' weighs these respective hoppers 20 one at a time.

Step (ix)

From these 'accurate weights' the host 76 attempts to pick a combination of 'accurate weights', the total weight of which is equal to the target weight or approximately equal to the target weight within preset error limits. It does this by performing the method adopted in the following example. This example assumes there are fourteen rather than twenty-eight hoppers 20, and therefore 'accurate weights'. However, as will be seen, the method can be used with any suitable number of 'accurate weights'.

The fourteen weights are arranged in ascending order, let this ascending order by denoted by the following fourteen letters:

a b c d e f g h i j k l m n

'a' is therefore the lightest weight progressing to 'n' the heaviest. Of these fourteen weights a selection is made of the lightest weight, i.e., 'a', and as many of the successively heavier weights, i.e. 'b,c . . . ', as is possible without the total weight of the selected weights exceeding the target weight. In this example let this selection be a,b,c and d. The final selected weights are to approximate the target weight as aforementioned. Let a selected weight be denoted by an underlining of the letter corresponding to the selected weight. Selection of the four lightest weights may therefore be written as:

a̲ b̲ c̲ d̲ e f g h i j k l m n

At this point there is defined a 'gap', this being the group of one or more unselected weights which, when all weights are written in ascending order as above, are written next to each other. There must be no occurence of a selected weight in the 'gap' and furthermore the lightest weight in the 'gap' must be the lightest unselected weight. In this example weights comprising the 'gap' are marked with an inverted comma after their respective letter. It may therefore be written:

a̲ b̲ c̲ d̲ e' f' g' h' i' j' k' l' m' n'

The unselected weight on the extreme right hand side (RHS) of the gap i.e. n' is then selected and the selected weight immediately adjacent the left hand side (LHS) of the 'gap' i.e. d̲ becomes unselected. Let this be called shuffle (1). It may therefore be written:

a̲ b̲ c̲ d e' f' g' h' i' j' k' l' m' n̲

The movement of the defined 'gap' should be noted. Shuffle (1) repeats until the total weight of the selected weights is greater than the target weight. The next step may therefore be written:

a̲ b̲ c' d' e' f' g' h' i' j' k' l' m̲ n̲

Assuming that at this point the total weight of the selected weights is greater than the target weight as aforementioned, then the selected weight adjacent the RHS of the 'gap' i.e. m̲ becomes unselected and the unselected weight on the RHS of the 'gap' i.e. l' is selected. Let this be shuffle (2). It may therefore be written:

a̲ b̲ c' d' e' f' g' h' i' j' k' l̲ m n̲

It is important here to note which unselected weights comprise the 'gap' (m not being one). Shuffle (2) repeats until the total weight of the selected weights is less than the target weight. Subsequent steps may therefore be written:

a b c' d' e' f' g' h' i' j' k̲l̲ m n̲ a b c' d' e' f' g' h' i' j̲ k l m n̲ a b c' d' e' f' g' h' i̲ j k l m n̲ a b c' d' e' f' g' h̲ i j k l m n̲ a b c' d' e' f' g̲ h i j k l m n̲

Assuming that at this point the total weight of the selected weights is less than the target weight then shuffle (1) is repeated until the total weight of the selected weights is greater than the target weight, then shuffle (2) is repeated until the total weight of the selected weights is less than the target weight, and so on until the total weight of the selected weights is equal to the target weight or approximately equal to the target weight with preset error limits as aforementioned.

During operation of the weigher 10 the situation may occur where one or more hoppers 20 remain unselected and therefore undischarged for a relatively long period of time due to it or them containing an erroneous weight. Because it is generally undesirable for product, particularly certain types of product, for example frozen food, to remain in undischarged hoppers 20 for too long the host 76 may associate a 'maximum product hold time' with each hopper 20 and if such is exceeded by any hopper 20 the host 76 'forces' it to be one of the selected hoppers 20 and therefore discharge. The selection process is then carried out using a target weight equal to the original target weight less the weight of the articles in the hopper to be forced and, of course, omitting the hopper to be forced from the selection process.

It will be understood that the first step of the selection process may be carried out by selecting a predetermined number of the lightest weights and then discarding the heaviest selected weight if the total of the originally selected weights is greater than the target weight.

In an alternative complementary selection process the step of selecting the lightest weight and as many of the successively heavier weights as is possible without the total weight of the selected weights exceeding the target weight is replaced by the step of selecting the heaviest weight, i.e. 'n' in the above example, and as many of the successively smaller weights, i.e. 'm, l, . . . ' in the above example, as are required in order that the total weight of the selected weights exceeds the target weight. Shuffle (1) is replaced by a similar shuffle involving replacing the lighter selected weights with lighter unselected weights instead of replacing the heavier selected weights with heavier unselected weights until the total weight of the selected weights is below the target weight and shuffle (2) is replaced by a similar shuffle involving the replacement of the last selected weight by the next heavier weight instead of the next lighter weight until the total weight of the selected weights is above the target weight.

Step (x)

Having found the necessary selected weights, the 'best pick combination', the host 76 performs various statistical calculations to up-date the monitoring of the efficiency of the combinational weighing system. Such statistical calculations determine certain settings and values of the combinational weight system (see step (vi) (a), (b), (c) above and step (xiv) below).

Step (xi)

In order for the host 76 to instruct the selected hoppers 20 to discharge their contents it must first receive a signal from a machine external to the combinational weighing system. Such a machine positions a container beneath the aperture 26 of the chute 24 in order to catch the discharge contents, and then sends a signal to the host 76 that such has been done.

Step (xii)

Once the host 76 has received the signal from the external positioning machine it sends a signal to the selected modules 22 instructing them to discharge the contents of their respective hoppers 20. The circuit intelligence of each module 22 present on the circuit board 46 then operates the stepper motor 36 to open the hopper door 21 as afore described. Because the stepper motor 36 is effectively under software control it is possible to alter easily the characteristics of the opening and closing of the hopper door 21, for example, the time for which the hopper door is open can be delayed as indicated in the flow diagram in FIG. 7. Furthermore, the stepper motor 36 can control the acceleration with which the hopper door 21 opens and closes. Such control facilitates the prevention of additional vibrations being imparted into the weigher 10 which might hinder weighing accuracy. Once the circuit intelligence of the module 22 has instructed the respective hopper door 21 to close it communicates this fact to the host 76. It should be noted here that the modules 22 can respond to a whole range of commands from the host 76, not all of which are concerned directly with the weighing and discharge of the contents of the hoppers 20. Each module 22 can perform its own diagnostics and report error conditions directly back to the host 76. Furthermore each module 22 can attempt to remedy the error conditions. It should further be noted at this point that the host 76 itself has diagnostic capabilities and can, for example, 'remove' any single module 22 from the operation of the combinational weighing system whilst allowing the combinational weighing operation of the remaining modules 22 to continue.

Step (xiii)

The host 76 now determines if any of the statistical monitoring values calculated in step (x) above should result in the alteration of various settings and values which themselves determine the overall operation of the combinational weighing system. Such settings and values have been detailed above (see step (vi) an (x)), however, others are:

(a) The amplitude of vibration of the feeders 14. The rate of product delivery to the hoppers 20 is determined by such. The host 76 monitors the 'mean feed time' of each hopper 20 and compares this with an 'ideal feed time' value stored in the host 76 for that particular product and speed of operation of the weigher 10. Adjustment of the amplitude of vibration of the feeders 14 is made to bring these two values as close a possible.

(b) The amplitude of vibration of the central table 12.

(c) The rate at which product is fed to the table 12.

We claim:

1. A combinational weighing system comprising:
(A) a plurality of weighing machines each comprising a weighing hopper and a associated hopper module arranged to provide a measurement of the weight of the contents of the associated hopper;

(B) means for feeding articles into said hoppers, including a plurality of channels via which articles are respectively fed from a common source directly into each of said hoppers;

(C) means for utilizing the weight measurements provided by said hopper modules to select from said hoppers a number of hoppers whose contents have a total weight substantially equal to a target weight;

(D) means for discharging said selected number of hoppers to provide a batch of articles of substantially said target weight, said hoppers being arranged to discharge directly into a collection chute to feed said batch of articles of substantially said target weight to a collection point; and (E) each said hopper module being associated with a respective control means for individually controlling the feeding of articles to the hopper associated with that hopper module in dependence on the weight of articles in that hopper, each said respective control means including (i) means for initiating said feeding of articles to said hopper, (ii) means for producing a first signal of analogue form indicative of the weight measure by said hopper module, (iii) digital-to-analogue converter means for producing a second signal in response to a signal received from a central control means of the system, (iv) a microprocessor for detecting when said first signal substantially equals said second signal, (v) means for causing the feeding of articles to said hopper to stop when said first signal equals said second signal, and (vi) means for communicating said first signal as detected to said central control means.

2. A system according to claim 1 wherein each said hopper module is associated with a respective calibrating means for individually calibrating that hopper module.

3. A system according to claim 2 wherein each said respective calibrating means comprises: a calibration mechanism including: a calibration weight; means for causing said calibration weight to be measured by said hopper module; and means for communicating the value of the weight of the calibration weight as measured by said hopper module to said central control means of the system.

4. A system according to claim 3 wherein said means for causing comprises a direct current solenoid.

5. A system according to claim 1 wherein each said hopper module is associated with a respective means for indivdually checking the accuracy of that hopper module.

6. A system according to claim 5 wherein each said respective checking means comprises: means for causing the weighing hopper associated with that hopper module to remain empty after being discharged; and means for communicating the signal output by that hopper module when said empty hopper is weighed by that hopper module to said central control means of the system.

7. A system according to claim 6 wherein, at any one time, only one of said plurality of weighing hoppers remains empty after a discharge.

8. A system according to claim 2 wherein each said weighing hopper is associated with a respective prime mover means for opening and closing a port in the hopper through which the contents of the hopper discharges when open.

9. A system according to claim 8, wherein said prime mover means is an electric stepper motor.

10. A system according to claim 9 wherein the system further includes software control means for controlling said electric stepper motor for varying the characteristics of the opening and closing of said port.

11. A system according to claim 1 wherein said common source comprises a substantially circular and substantially flat surface onto which said articles are fed; said plurality of channels extending radially outward from beneath said surface; and said system further includes vibrator means connected to said surface and said channels to cause vibratory motion of said surface and channels and thereby cause said articles fed onto said surface to pass radially outward across said surface, into and radially outward along said plurality of channels, and into said plurality of respective hoppers.

12. A system according to claim 1 wherein the top of one side of each of said plurality of channels is folded over the top of the other side of the adjacent channel so as to prevent said articles falling between adjacent areas of said plurality of channels.

13. A combinational weighing system comprising:

(A) a plurality of weighing machines each comprising a weighing hopper and an associated hopper module arranged to provide a measurement of the weight of the contents of the associated hopper;

(B) means for feeding articles into said hopper, including a plurality of channels via which articles are respectively fed from a common source directly into each of said hoppers;

(C) means for utilizing the weight measurements provided by said hopper modules to select from said hoppers a number of hoppers whose contents have a total weight substantially equal to a target weight;

(D) means for discharging said selected number of hoppers to provide a batch of articles of substantially said target weight, said hoppers being arranged to discharge directly into a collection chute to feed said batch of articles of substantially said target weight to a collection point; and (E) each said hopper module being associated with a respective calibrating means for individually calibrating that hopper module, said calibrating means including (i) means for producing a first signal indicative of the weight measured by said hopper module, (ii) means for producing a second signal in response to a signal derived from a central control means of the system, (iii) control means for repeatedly causing said second signal to be altered until said second signal substantially equals said first signal, and (iv) means for communicating the value of said second signal to said central control means when said second signal substantially equals said first signal.

14. A system according to claim 13 wherein said control means repeatedly causes said second signal to be altered in dependence upon the difference between said second signal and said first signal as measured in a summing junction of said respective calibrating means.

15. A system according to claim 13 wherein: said first and second signals are of analogue form; said means for producing said second signal comprises one fine and one coarse digital to analogue converter; and said control means is a microprocessor.

16. A combinational weighing system comprising:
(A) a plurality of weighing machines each comprising a weighing hopper and an associated hopper module arranged to provide a measurement of the weight of the contents of the associated hopper;
(B) means for feeding articles into said hopper, including a plurality of channels via which articles are respectively fed from a common source directly into each of said hoppers;
(C) means for utilizing the weight measurements provided by said hopper modules to select from said hoppers a number of hoppers whose contents have a total weight substantially equal to a target weight;
(D) means for discharging said selected number of hoppers to provide a batch of articles of substantially said target weight, said hoppers being arranged to discharge directly into a collection chute to feed said batch of articles of substantially said target weight to a collection point; and
(E) each of said hopper module being associated with a respective checking means for individually checking the accuracy of that hopper module, each said respective checking means including
 (i) means for causing the weighing hopper associated with that hopper module to remain empty after being discharged, said causing means being operative for causing the weighing hopper associated with that hopper module to remain empty after being discharged only after said weighing hopper has already been discharged a predetermined number of times, and
 (ii) means for communicating the signal output by that hopper module when said empty hopper is weighed by that hopper module to a central control means of the system.

17. A combinational weighing system comprising:
(A) a plurality of weighing machines each comprising a weighing hopper and an associated hopper module arranged to provide a measurement of the weight of the contents of the associated hopper;
(B) means for feeding articles into said hopper, including a plurality of channels via which articles are respectively fed from a common source directly into each of said hoppers;
(C) means for utilizing the weight measurements provided by said hopper modules to select from said hoppers a number of hoppers whose contents have a total weight substantially equal to a target weight;
(D) means for discharging said selected number of hoppers to provide a batch of articles of substantially said target weight, said hoppers being arranged to discharge directly into a collection chute to feed said batch of articles of substantially said target weight to a collection point; and
(E) each said weighing hopper being associated with a respective electric stepper motor having a rotor and operative for opening and closing a port in the hopper through which the contents of the hopper discharge when open by means of the rotation of a dog clutch fixed at one end to the rotor of the stepper motor and positioned so as to engage at the other end a mechanism for opening and closing said port.

* * * * *